United States Patent
Jung et al.

(10) Patent No.: US 8,266,330 B2
(45) Date of Patent: Sep. 11, 2012

(54) METHOD AND CONTROLLER FOR PROCESSING COMMANDS IN A STORAGE DEVICE

(75) Inventors: Won-Seok Jung, Seoul (KR); Hye-Young Kim, Seoul (KR); Kyoung-Back Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

(21) Appl. No.: 12/659,000

(22) Filed: Feb. 18, 2010

(65) Prior Publication Data

US 2010/0287310 A1 Nov. 11, 2010

(30) Foreign Application Priority Data

May 8, 2009 (KR) .......................... 10-2009-0040442

(51) Int. Cl.
*G06F 3/00* (2006.01)
(52) U.S. Cl. ............................................ 710/5
(58) Field of Classification Search ........................ 710/5
See application file for complete search history.

(56) References Cited

U.S. PATENT DOCUMENTS

| | | | | |
|---|---|---|---|---|
| 6,311,257 B1 * | 10/2001 | Fitzgerald et al. | ............ | 711/170 |
| 6,851,011 B2 | 2/2005 | Lin | ................... | 711/4 |
| 6,859,859 B2 * | 2/2005 | Hall | ............... | 711/112 |
| 7,167,959 B2 * | 1/2007 | Lin | ................... | 711/158 |
| 7,373,460 B2 * | 5/2008 | Kobayashi et al. | ............ | 711/137 |
| 7,664,884 B2 * | 2/2010 | Kanamaru et al. | ................ | 710/5 |
| 7,694,026 B2 * | 4/2010 | Huffman | ............... | 710/5 |
| 7,818,479 B2 * | 10/2010 | Takeuchi et al. | ................ | 710/59 |
| 2004/0088479 A1 * | 5/2004 | Hall | .............. | 711/112 |
| 2005/0080842 A1 * | 4/2005 | Takeuchi et al. | ............. | 709/200 |
| 2006/0271739 A1 * | 11/2006 | Tsai et al. | ..................... | 711/123 |
| 2008/0005398 A1 * | 1/2008 | Huffman | ......................... | 710/39 |
| 2009/0006606 A1 * | 1/2009 | Lubbers et al. | ............... | 709/224 |
| 2009/0248903 A1 * | 10/2009 | Nishita et al. | ..................... | 710/5 |
| 2010/0067133 A1 * | 3/2010 | Ooi | ................. | 360/31 |
| 2010/0262721 A1 * | 10/2010 | Asnaashari et al. | ............. | 710/5 |

OTHER PUBLICATIONS

Japanese Patent Publication No. 10-233091 to Shinichi, having Publication date of Sep. 2, 1998 (w/English Abstract page).
Japanese Patent Publication No. 2003-076499 to Wen, having Publication date of Mar. 14, 2003 (w/English Abstract page).
Japanese Patent Publication No. 2003-203490 to Takehito, having Publication date of Jul. 18, 2003 (w/English Abstract page).

* cited by examiner

*Primary Examiner* — Chun-Kuan Lee
*Assistant Examiner* — Ronald Modo
(74) *Attorney, Agent, or Firm* — Monica H. Choi

(57) ABSTRACT

A controller for processing a command in a data storage device includes at least one bitmap and a firmware command que. The at least one bitmap is formed in hardware to indicate that the command is received. The firmware command que is generated by firmware for storing the command when the at least one bitmap indicates receipt of the command. The firmware generates the firmware command que that is of variable size for processing a high number of commands. In addition, the bitmaps are generated in the hardware for quickly receiving the high number of commands.

20 Claims, 12 Drawing Sheets

METHOD AND CONTROLLER FOR PROCESSING COMMANDS IN A STORAGE DEVICE

CROSS-REFERENCE TO RELATED APPLICATION(s)

The present application claims priority under 35 U.S.C. §119 to Korean Patent Application No. 10-2009-0040442, filed on May 8, 2009, which is incorporated herein by reference in its entirety.

TECHNICAL FIELD

The present invention relates generally to a controller for processing commands in an electronic storage system such as a solid storage drive (SSD) for example, and more particularly, to using at least one bitmap in hardware and a command que in firmware for processing a high number of commands quickly.

BACKGROUND

Many electronic systems such as a computer system or a computer network include a data storage device such as a solid storage drive (SSD) that is used as a hard drive. Data is transferred to and from the data storage device using a serial interface protocol such as according to the SAS (serial attached SCSI) technology.

The serial interface for such data transfer is desired to operate at high speed such as at 3 Gbps (giga-bits per second). In addition, such a serial interface is desired to process a high number of commands in a short time period. The prior art serial interface uses a hardware command que created in a memory device with a fixed size such that a high number of commands may not be processed.

Accordingly, a data storage device is desired to respond faster to commands from a host and to process a high number of commands, especially with data being transferred via a serial interface.

SUMMARY OF THE INVENTION

Accordingly, in a general aspect of the present invention, a controller in a data storage device generates a firmware command que with variable size for quickly processing a high number of commands.

A controller for processing a command in a data storage device according to an embodiment of the present invention includes at least one bitmap and a firmware command que. The at least one bitmap is formed in hardware to indicate that the command is received. The firmware command que is generated by firmware for storing the command when the at least one bitmap indicates receipt of the command.

In an example embodiment of the present invention, the at least one bitmap is formed in a hardware register module.

In another embodiment of the present invention, the firmware includes at least one memory device and a data processor. The memory device has sequences of instructions stored thereon, and the data processor executes the sequences of instructions such that the firmware performs a step of:

generating the firmware command que for storing the command when the at least one bitmap indicates receipt of the command.

In a further embodiment of the present invention, the at least one bitmap includes a first bitmap that is set by the hardware when the command is received. In addition, the data processor executes the sequences of instructions such that the firmware performs a further step of:

setting a second bitmap when the command has been stored into the firmware command que.

In an example embodiment of the present invention, the first bitmap is read-only to the firmware, and the second bitmap is read/write to the firmware. For example, the first bitmap includes a respective first bit that is read-only to the firmware and that is read/write to the hardware for each command. The second bitmap includes a respective second bit that is read/write to the firmware for each command.

In a further embodiment of the present invention, the controller further includes an interrupt controller for generating a first interrupt when the respective first bit has been set by the hardware and when the respective first and second bits for the command are different. In that case, the firmware stores the command into the firmware command que when the first interrupt is generated, and the firmware sets the respective second bit after the command is stored into the firmware command que.

In another embodiment of the present invention, the command that is stored in the firmware command que is performed when the respective first and second bits are set. In that case, the respective first bit in the first bitmap is reset by the hardware after the command is performed.

In a further embodiment of the present invention, the interrupt controller generates a second interrupt when the respective first bit has been reset by the hardware and when the respective first and second bits for the command are different. In that case, the data processor executes the sequences of instructions such that the firmware performs the further steps of:

resetting the respective second bit when the second interrupt is generated; and removing the command from the firmware command que.

In another embodiment of the present invention, the controller further includes an auto-response module for sending an auto-response signal to a host that sent the command after the command is performed. In that case, the hardware receives an acknowledge signal to the auto-response signal from the host, and the hardware resets the respective first bit after the acknowledge signal is received.

In a further embodiment of the present invention, the controller further includes a command information table generated in the hardware for storing information about the command when the command is received. In that case, the data processor executes the sequences of instructions such that the firmware performs a further step of:

transferring the information about the command from the command information table to the firmware command que when the command is stored into the firmware command que.

In another embodiment of the present invention, the command is sent from the host to the data storage device via a high speed serial interface. In a further embodiment of the present invention, the data storage device is within one of a client or a server of a computer network.

In another aspect of the present invention, a data storage system includes the data storage device and the host sending the command to the data storage device. The data storage device includes the above described embodiments of the controller.

In this manner, the firmware generates the firmware command que that is of variable size for processing a high number of commands. In addition, the bitmaps are generated in the hardware for quickly receiving a high number of commands from the host via a high speed serial interface. Thus, the data storage device may respond faster to the host sending the commands.

These and other features and advantages of the present invention will be better understood by considering the following detailed description of the invention which is presented with the attached drawings.

BRIEF DESCRIPTION OF THE DRAWINGS

The figures referred to herein are drawn for clarity of illustration and are not necessarily drawn to scale. Elements having the same reference number in FIGS. 1, 2, 3, 4, 5, 6, 7, 8, 9, 10, 11, 12, and 13 refer to elements having similar structure and/or function.

DETAILED DESCRIPTION

Figure 1:
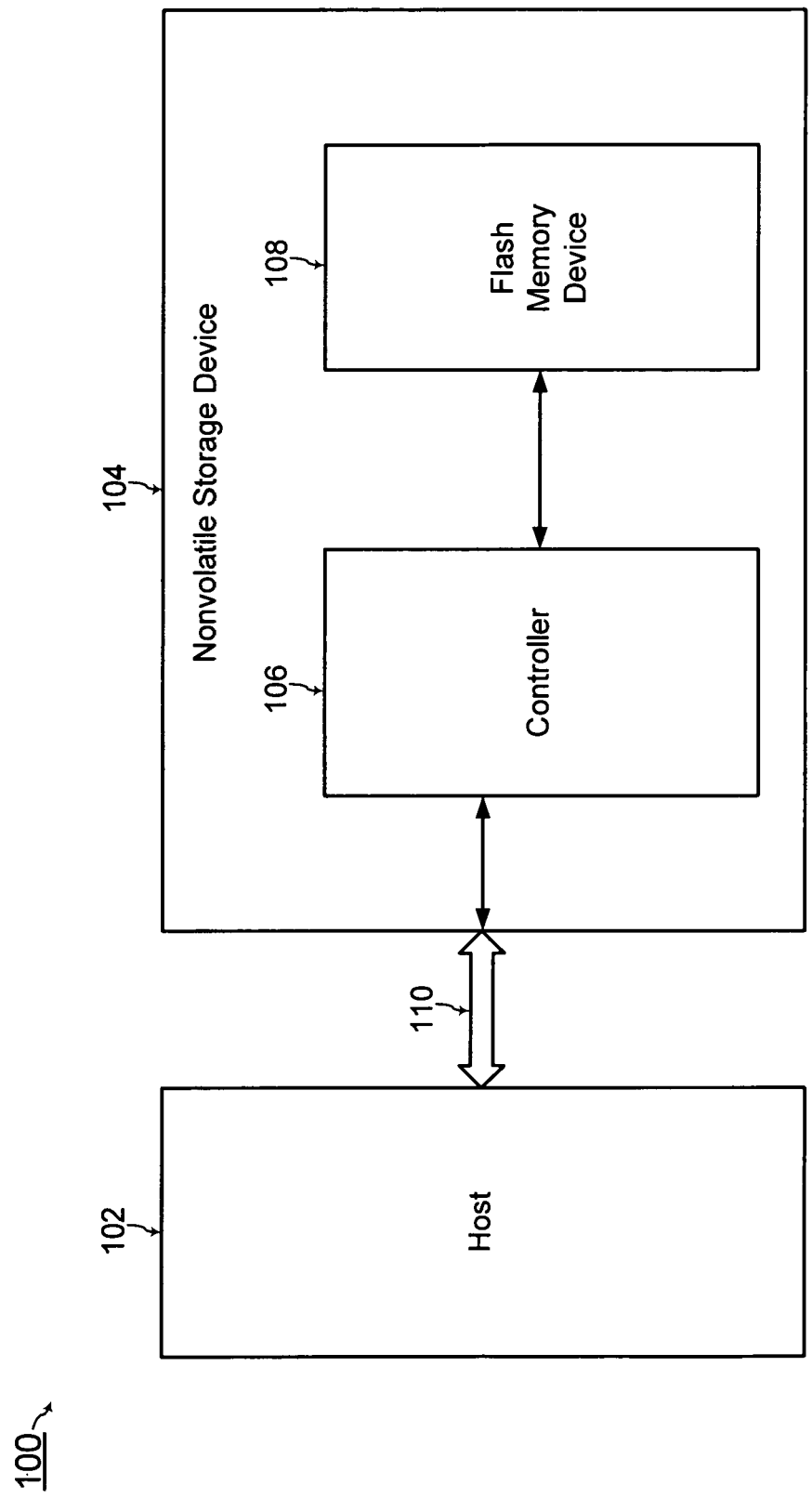
FIG. 1 shows a block diagram of a data storage system having a host and a data storage device for processing commands from the host according to example embodiments of the present invention.

FIG. 1 shows a block diagram of a data storage system 100 having a host 102 and a data storage device 104 such as a nonvolatile storage device, according to an example embodiment of the present invention. For example, the nonvolatile storage device 104 includes a controller 106 and a flash memory device 108.

In addition, the host 102 communicates with the data storage device 104 via a serial interface 110 using a serial interface protocol such as according to the SAS (serial attached SCSI) technology or the PCI (peripheral component interface) Express technology for example. The controller 106 receives and processes commands sent from the host 102 according to such a serial interface protocol.

Figure 2:
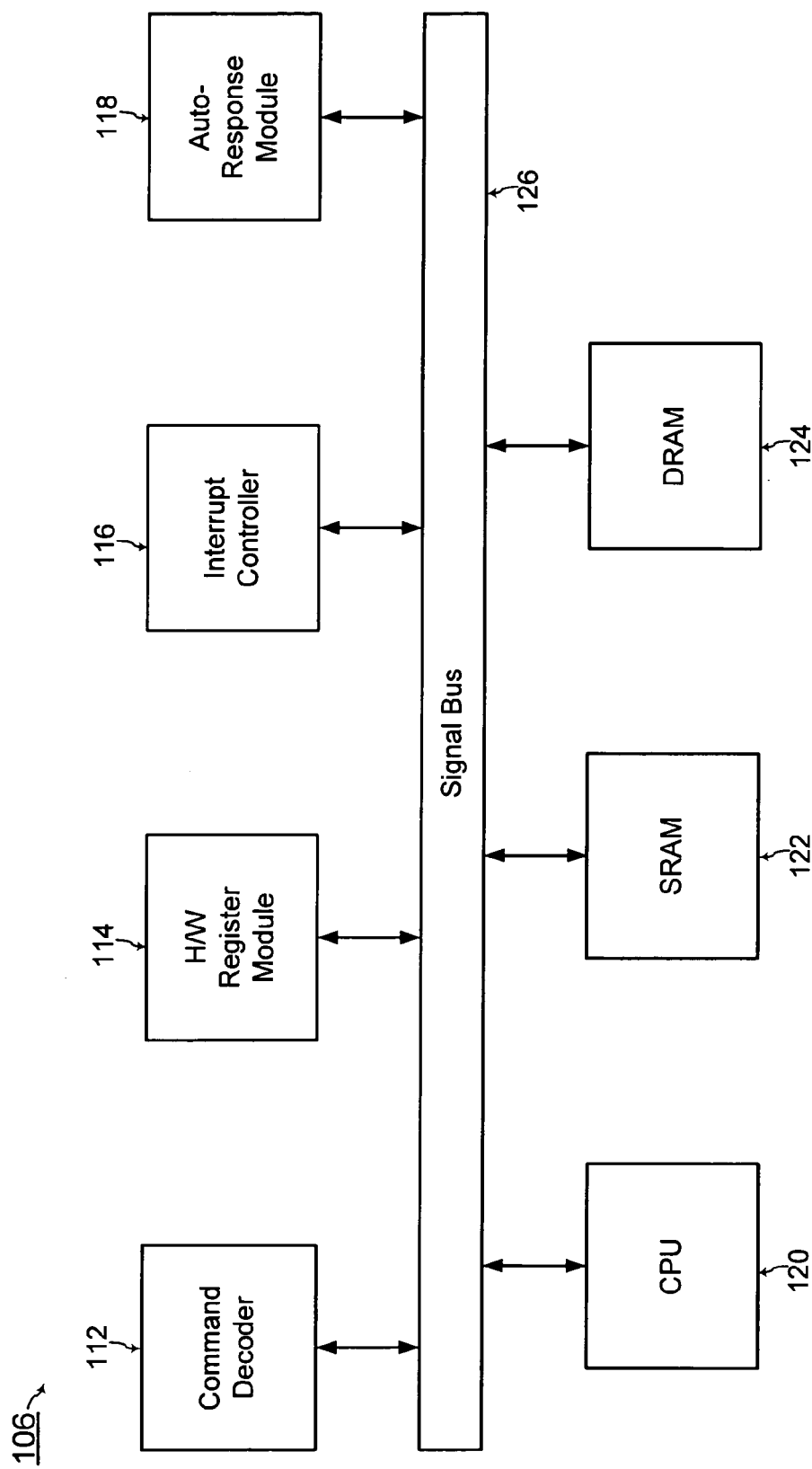
FIG. 2 shows a block diagram of a controller in the data storage device of FIG. 1 for processing the commands according to example embodiments of the present invention.

FIG. 2 shows a block diagram of the controller 106 of FIG. 1, according to an example embodiment of the present invention. The controller 106 includes a command decoder 112, a hardware (H/W) register module 114, an interrupt controller 116, an auto-response module 118, a CPU (central processing unit) data processor, an SRAM (static random access memory) device 122, and a DRAM (dynamic random access memory) device 124. Such components 112, 114, 116, 118, 120, 122, and 124 are coupled to each-other via a signal bus 126.

Figure 3:
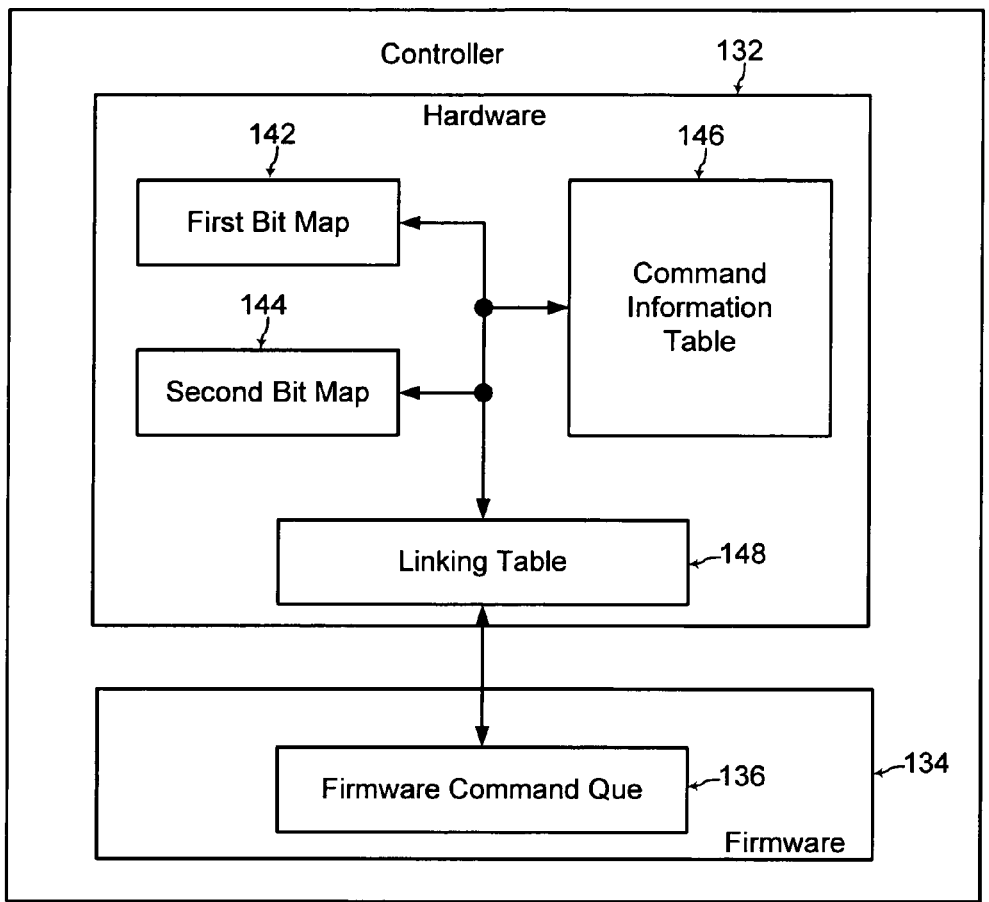
FIG. 3 shows a block diagram of components formed in hardware and firmware of the data storage device of FIG. 1 for processing the commands according to example embodiments of the present invention.

FIG. 3 shows a conceptual diagram of hardware 132 and firmware 134 of the controller 106 in the data storage device 104 of FIG. 1. A firmware command que 136 is generated by the firmware 134 according to an aspect of the present invention. A first bitmap 142 and a second bitmap 144 are formed in the hardware 132 according to another aspect of the present invention. Furthermore, a command information table 146 and a linking table 148 are formed in the hardware 132 according to a further aspect of the present invention.

Figure 4:
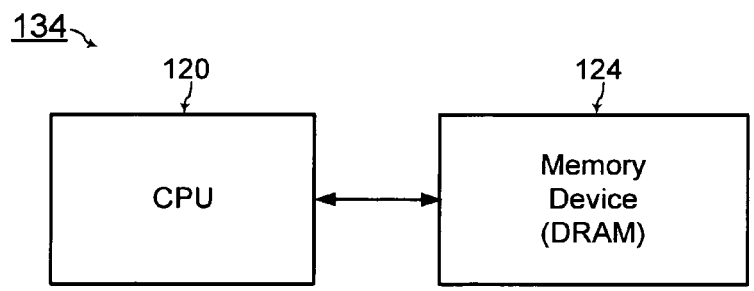
FIG. 4 shows a block diagram of components for forming the firmware in the data storage device of FIG. 3, according to an example embodiment of the present invention.

FIG. 4 shows a block diagram of components of the controller of FIG. 2 for forming the firmware 134 of FIG. 3. The firmware 134 is formed by sequences of instructions (i.e., software) stored in the DRAM device 124 that is also executed by the CPU data processor 120 for performing the functions/steps/operations described as being performed by the firmware 134 with reference to FIGS. 5, 6, 7, 8, and 9. Such sequences of instructions may be stored in the flash memory device 108 and then transferred to the DRAM device 124 to be executed by the CPU data processor 102 upon power on or reset of the data storage system 100.

The hardware 132 is formed by the command decoder 112, the H/W register module 114, the interrupt controller 116, the auto-response module 118, the SRAM device 122, and the DRAM device 124 of the controller 106. For example, the first and second bitmaps 142 and 144 are formed in the SRAM device 122, the DRAM device 124, or the H/W register module 114. The command information table 146 is formed in the DRAM device 124, and the linking table 148 is formed in the H/W register module 114, according to an example embodiment of the present invention.

Operation of the controller 106 in the nonvolatile storage device 104 is now described with reference to the flowcharts of FIGS. 5 and 8 and the timing diagrams of FIGS. 6, 7, and 9. Upon power on or reset, the H/W register module 114 is initialized, and the first and second bitmaps 142 and 144 are reset by the firmware 134 (step S1 of FIG. 5).

Figure 5:
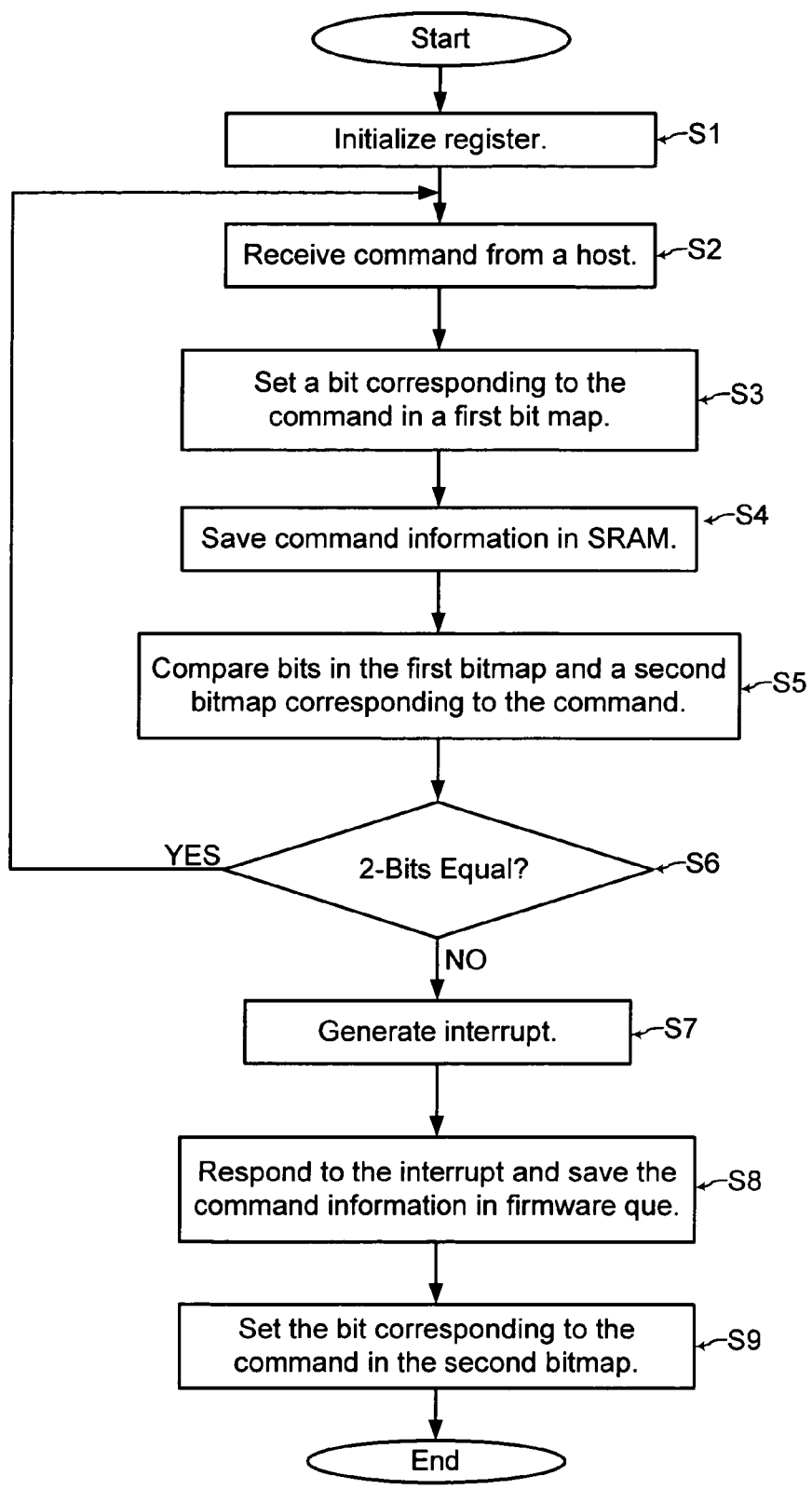
FIG. 5 shows a flowchart of steps during operation of the data storage device of FIGS. 2 and 3, according to an example embodiment of the present invention.
Figure 6:
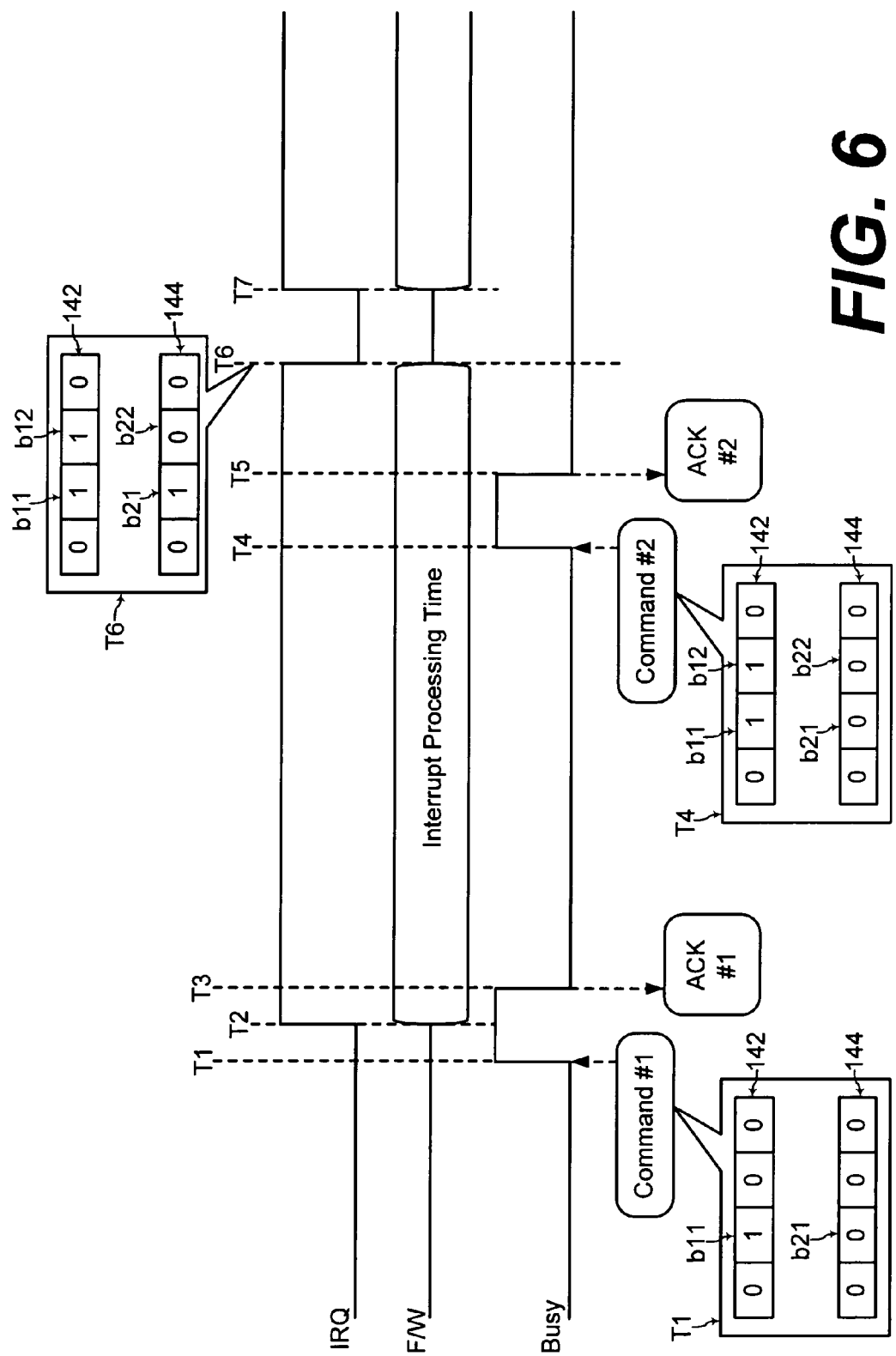
FIGS. 6 and 7 show timing diagrams of signals during operation of the data storage device of FIGS. 2 and 3, according to an example embodiment of the present invention.

The controller 106 of the data storage device 104 receives a first command #1 at time point T1 of FIG. 6 (step S2 of FIG. 5). The first command #1 is generated by the host 102 and sent to the controller 106 of the data storage device 104 via the serial interface 110. Upon receiving the first command #1, the hardware sets a corresponding bit b11 of the first bitmap 142 to a logical high state (step S3 of FIG. 5).

In addition, the firmware 134 saves information of the command (i.e., command information) into the command information table 146 in the SRAM 122 for example (step S4 of FIG. 5). The H/W register module 144 includes the start address of the SRAM 122 for the command information table 146, and also includes an address offset from such a start address for storing the respective command information for each command. Such information about each command forms the linking table 148 that also includes the location of respective bits in the first and second bitmaps 142 and 144 corresponding to each command.

The interrupt controller 116 compares the respective bits b11 and b21 of the first and second bitmaps 142 and 144 for the received first command #1 (step S5 of FIG. 5). If such respective bits b11 and b21 are equal (step S6 of FIG. 5), then a corresponding command has not yet been received, and the flowchart of FIG. 5 returns to step S2 until a corresponding command is received.

The respective bits b11 and b21 being unequal (step S6 of FIG. 5) indicates that the respective command #1 has been received. In that case, the interrupt controller 116 generates an interrupt with an interrupt signal IRQ being activated at time point T2 of FIG. 6 (step S7 of FIG. 5). Accordingly, the firmware 134 responds to such an interrupt by saving the corresponding command information from the command information table 146 into the firmware command que 136 during time period T2 to T6 (interrupt processing time) of FIG. 6 (step S8 of FIG. 5). At time point T6 of FIG. 6, the firmware 134 sets the bit b21 of the corresponding command #1 in the second bitmap 144 to the logical high state (step S9 of FIG. 5).

In this manner, the first bitmap 142 is read-only to the firmware 134 with the hardware 132 setting or resetting the first bitmap 142, according to an embodiment of the present invention. Thus, the first bitmap 142 is read/write to the hardware 132.

In contrast, the second bit-map 144 is read/write to the firmware 134, according to an embodiment of the present invention. The firmware 134 reads a corresponding bit of the second bit-map 144 for determining whether a command is ready to be processed by the firmware 134. The firmware 134 sets a bit of the second bit-map 144 for indicating storing of a corresponding command into the firmware command que 136. The firmware 134 resets the bit of the second bit-map 144 for indicating that a corresponding command has been processed by the firmware 134.

Further referring to FIG. 6, the hardware 132 generates a Busy signal that is activated upon receiving the first command #1 from the host 102 at time point T1. The hardware 132 then deactivates the Busy signal and sends a first acknowledge signal ACK #1 to the host 102 at time point T3 after recognizing receipt of the first command #1 at time point T1.

Also referring to the example of FIG. 6, a second command #2 is received at time point T4 before the firmware is finished processing the interrupt for the first command #1 at time point T6. In that case, the hardware 132 sets a respective bit b12 corresponding to the second command #2 in the first bitmap 142 to the logical high state at time point T4. In addition, the information for that second command #2 is saved into the SRAM device 122 upon such setting of the respective bit b12 in the first bitmap 142.

In this manner, the second command #2 is received and processed by the hardware 132 of the controller 106 before the firmware 134 processes such a command #2. The firmware 134 first processes the first command #1 before processing the second command #2. The hardware 132 of the controller 106 generally operates faster than the firmware 134 of the controller 106. The hardware 132 of the controller 106 saves information for the command #2 received before the firmware 134 is ready to process such a command #2. Thus, the hardware 132 of the controller 106 receives and processes a high number of commands from the host 102 that the firmware 134 subsequently also processes.

Figure 7:
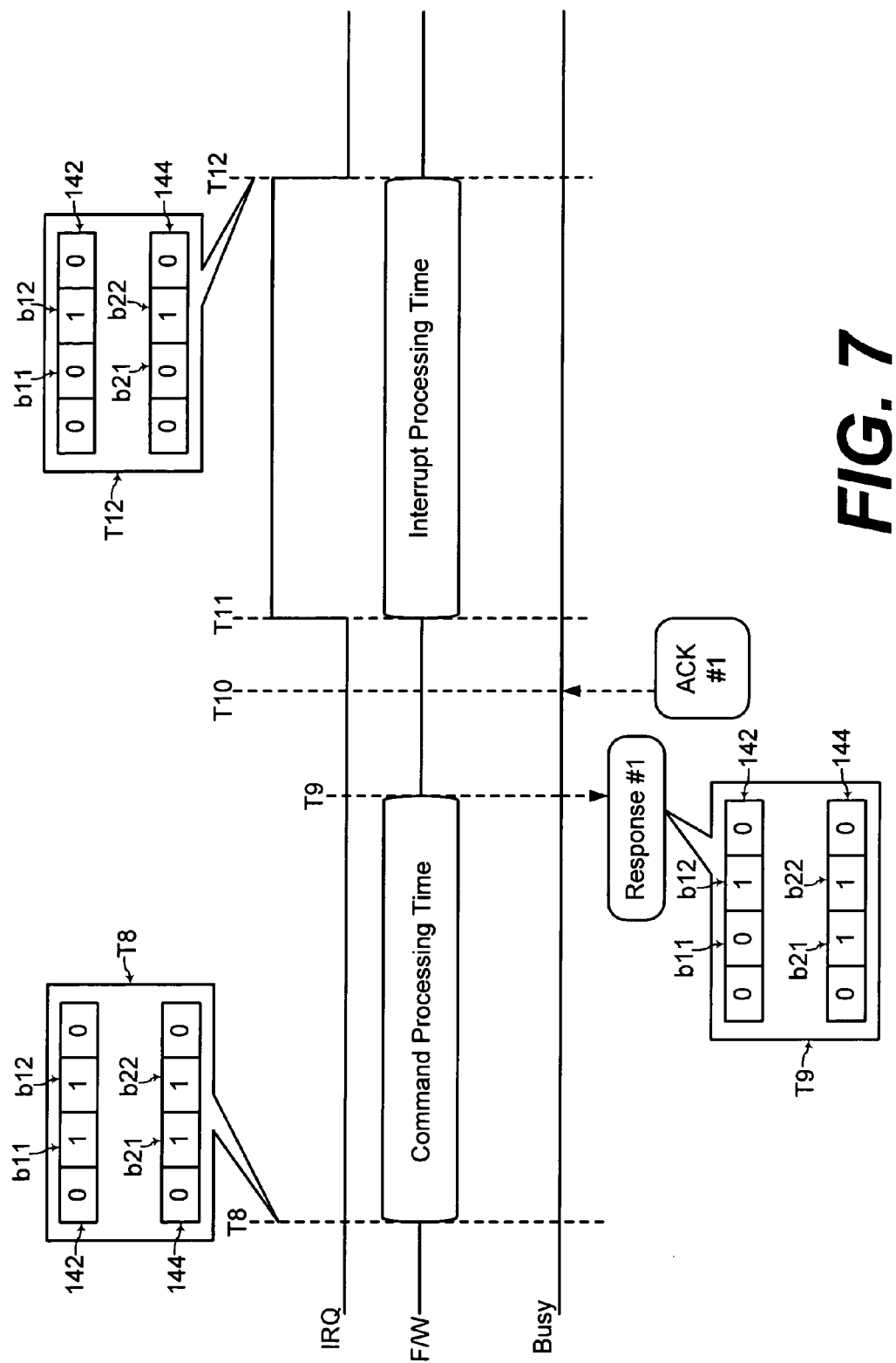

Referring to FIGS. 5, 6, and 7, the firmware 134 saves information of the second command #2 (i.e., respective command information) into the command information table 146 in the SRAM 122. The respective bits b12 and b22 being unequal indicates that the respective command #2 has been received. Accordingly, the firmware 134 saves the correspond command information from the command information table 146 into the firmware command que 136 and sets the bit b22 of that command #2 in the second bitmap 144 to the logical high state by time point T8 of FIG. 7.

Further referring to FIG. 6, the hardware 132 activates the Busy signal upon receiving the second command #2 from the host 102 at time point T4. The hardware 132 then deactivates the Busy signal and sends a second acknowledge signal ACK #2 to the host 102 at time point T5 after recognizing receipt of the second command #2 at time point T4.

Figure 8:
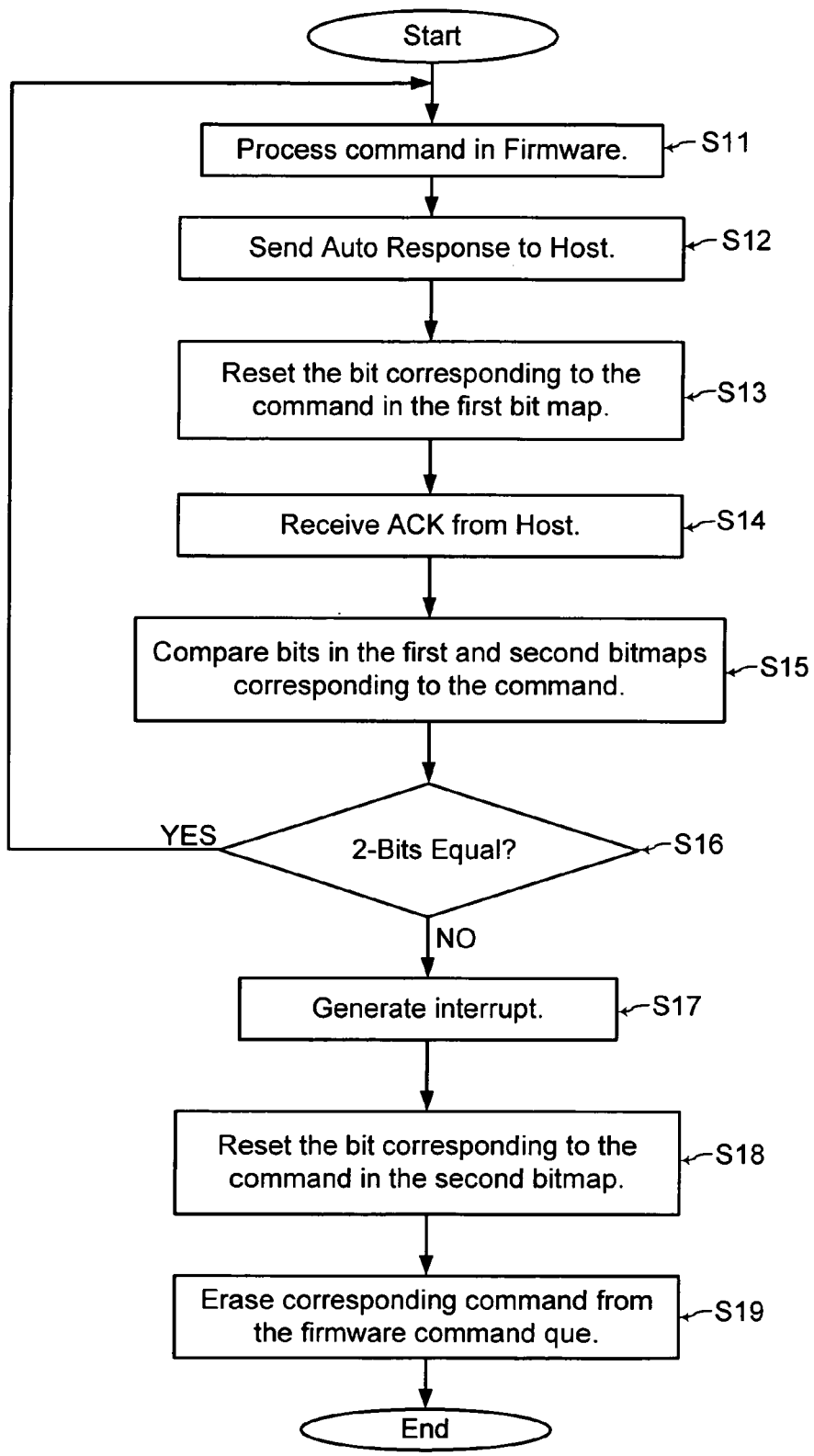
FIG. 8 shows a flowchart of further steps during operation of the data storage device of FIGS. 2 and 3, according to an example embodiment of the present invention.

Referring to FIGS. 7 and 8, the respective bits b11 and b21 being equal in the first and second bitmaps 142 and 144 indicates that the firmware 134 recognizes that the corresponding command #1 has been received and stored to be processed. Accordingly, the firmware 134 processes such a command #1 as stored in the firmware command que 136, during time period T8 to T9 of FIG. 7 (step S11 of FIG. 8). Components of the hardware 132 such as the linking table 148 and the firmware 134 may also be used to process the command #1 during the time period T8 to T9 of FIG. 7 (step S11 of FIG. 8).

After the command #1 is processed, the firmware 134 controls the auto-response module 118 of the hardware 132 to generate an auto-response signal to the host 102 at time point T9 of FIG. 7 (step S12 of FIG. 8). In addition, the auto-response module 118 of the hardware 132 resets the bit b11 of the first command #1 in the first bitmap 142 to the logical low state (step S13 of FIG. 8). The controller 106 receives a corresponding acknowledge signal from the host 102 at time point T10 with the host acknowledging receipt of such an auto-response signal (step S14 of FIG. 8).

The interrupt controller 116 of the hardware 132 compares the respective bits b11 and b21 of the first and second bitmaps 142 and 144 for the first command #1 (step S15 of FIG. 8). If such respective bits b11 and b21 are equal (step S16 of FIG. 8), then the first command #1 has not yet been processed, and the flowchart of FIG. 8 returns to step S11 until the corresponding command #1 is processed.

The respective bits b11 and b21 being unequal (step S16 of FIG. 8) indicates that the respective command #1 has been processed. In that case, the interrupt controller 116 generates an interrupt with the interrupt signal IRQ being activated at time point T11 of FIG. 7 (step S17 of FIG. 8). Accordingly, the firmware 134 responds to such an interrupt by resetting the bit b21 of the corresponding command #1 in the second bitmap 144 to the logical low state by time point T12 of FIG. 7 (step S18 of FIG. 8). In addition, the firmware 134 erases the respective command #1 that has been processed from the firmware command que 136 (step S19 of FIG. 8).

Such steps of the flowcharts of FIGS. 5 and 8 are for receiving and processing the one example command #1. The steps of the flowcharts of FIGS. 5 and 8 are also performed for each command received as indicated by the first and second bitmaps 142 and 144. For example referring to FIGS. 7 and 8, the respective bits b21 and b22 being equal to the logical high state in the first and second bitmaps 142 and 144 indicates that the firmware 134 recognizes that the corresponding command #2 has been received and stored into the firmware command que 136 to be processed. Accordingly, the steps of the flowchart of FIG. 8 are performed for processing such a command #2 after the time point T12.

Figure 9:
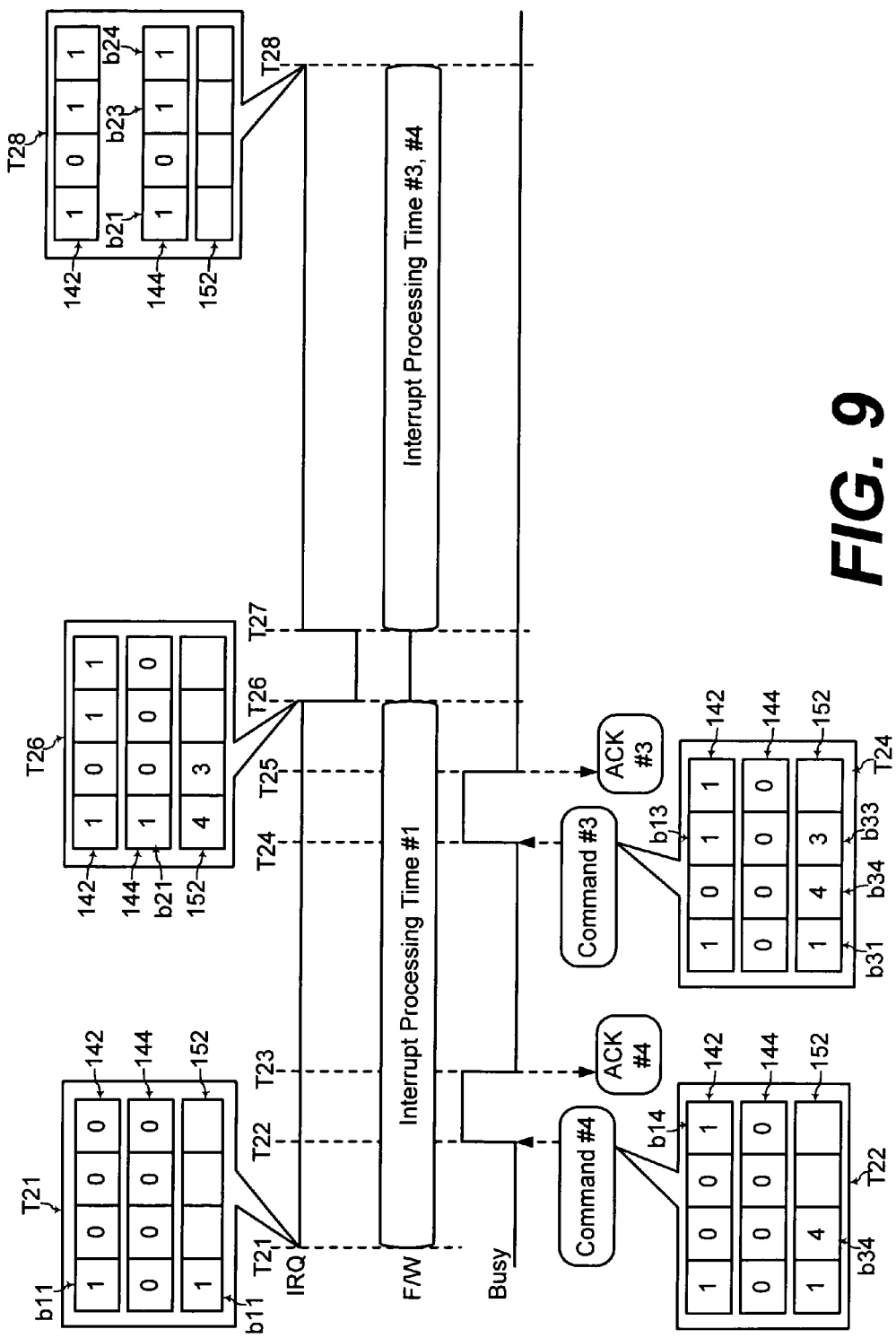
FIG. 9 shows a timing diagram of signals during further operation of the data storage device of FIGS. 2 and 3, according to an example embodiment of the present invention.

FIG. 9 shows a timing diagram of signals during operation of the nonvolatile storage device 104 using an order que 152 according to another embodiment of the present invention.

The order que 152 is generated in the SRAM device 122 similar to the first and second bitmaps 142 and 144 or as a register in the H/W register module 114.

In the example of FIG. 9, a first command #1 has been received, and a corresponding bit b11 in the first bitmap 142 is set to the logical high state. In addition, a corresponding order tag b31 for the first command #1 is entered in the order que 152.

Subsequently at time point T22, a fourth command #4 is received, and a corresponding bit b14 of the first bitmap 142 is set to the logical high state. Also, a corresponding order tag b34 for the fourth command #4 is entered in the order que 152. At time point T23, the controller 106 sends an acknowledgement to the host 102 that the fourth command #4 has been received.

Thereafter at time point T24, a third command #3 is received, and a corresponding bit b13 of the first bitmap 142 is set to the logical high state. Also, a corresponding order tag b33 for the third command #3 is entered in the order que 152. At time point T25, the controller 106 sends an acknowledgement to the host 102 that the third command #3 has been received.

Further referring to FIG. 9, the interrupt signal IRQ is activated for saving the first command #1 into the firmware command que 136 during time period T21 to T26. Furthermore, the firmware 134 sets a corresponding bit b21 of the second bitmap 144 for indicating that the first command #1 has been entered into the firmware command que 136. In addition, the corresponding order tag b31 for the first command #1 is cleared from the order que 152 after the interrupt processing time period T21 to T26.

Also referring to FIG. 9, the interrupt signal IRQ is activated for saving the fourth and third commands #4 and #3 into the firmware command que 136 during time period T27 to T28. Furthermore, the firmware 134 sets corresponding bits b23 and b24 of the second bitmap 144 for indicating that the fourth and third commands #4 and #3 have been entered into the firmware command que 136. In addition, the corresponding order tags b34 and b33 for the fourth and third commands #4 and #3 are cleared from the order que 152 after the interrupt processing time period T27 to T28.

In this manner, the order que 152 is used for indicating by the hardware 132 to the firmware 134 the order for storing the commands into the firmware command que 136. In the example of FIG. 9, the first command #1, the fourth command #4, and the third command #3 are entered into the firmware command que 136 in that order by the firmware 134.

Figure 10:
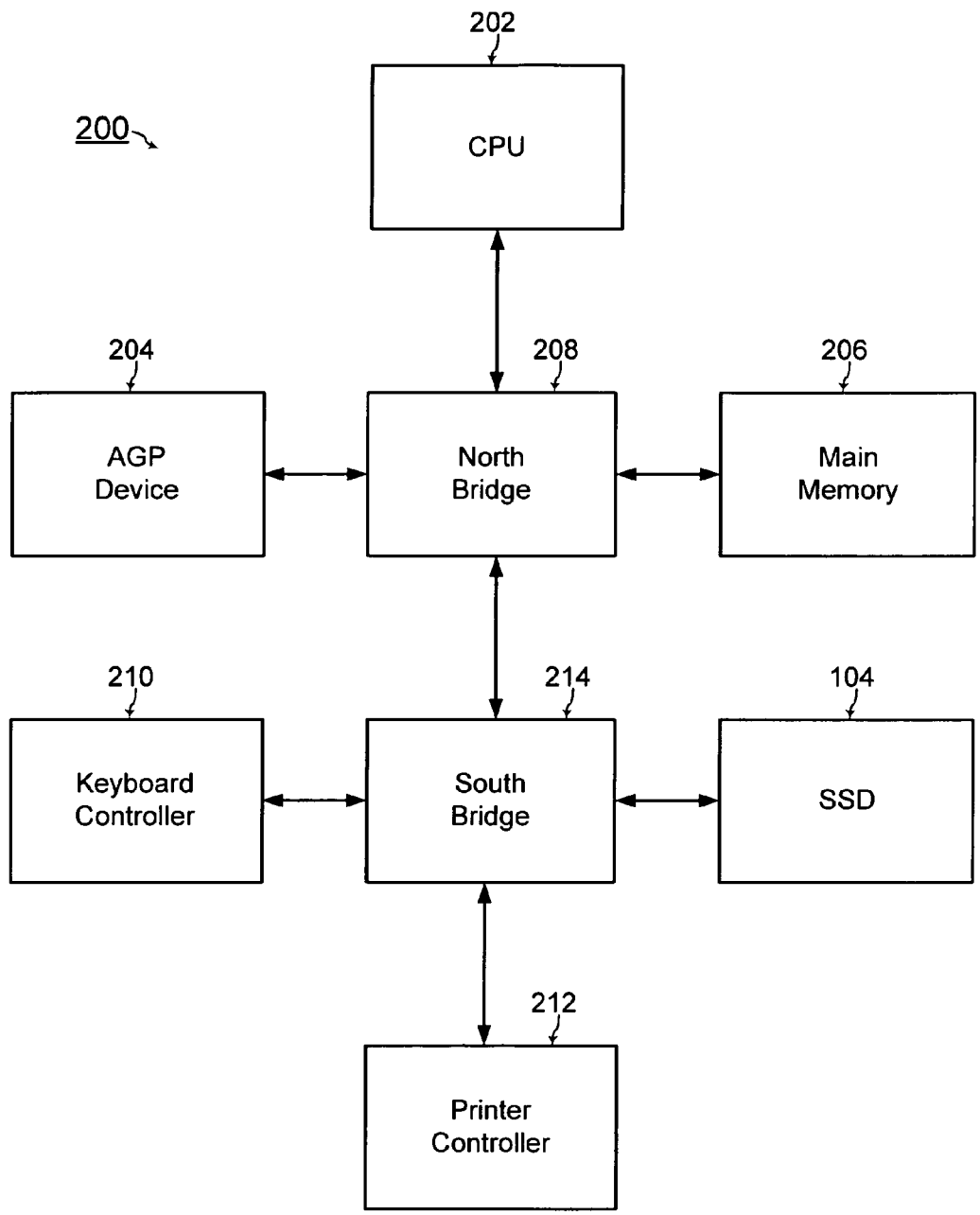
FIG. 10 shows a block diagram of a computer system having the data storage device of FIG. 1, according to an example embodiment of the present invention.

FIG. 10 shows a block diagram of a PC (personal computer) system 200 having a solid state drive (SSD) implemented as the nonvolatile storage device 104 of FIG. 1. The PC system 200 includes a computer CPU (central processing unit) 202, and includes an AGP (accelerated graphics port) device 204 and a main memory 206 coupled to the computer CPU 202 via a north bridge 208.

The PC system 200 further includes a keyboard controller 210, a printer controller 212, and the SSD 104 coupled to the computer CPU 202 via a south bridge 214 and the north bridge 208. The components 202, 204, 206, 208, 210, 212, and 214 of the PC system 200 are generally and individually known to one of ordinary skill in the art. The SSD 104 is implemented similarly as the nonvolatile storage device 104 of FIG. 1 as described herein, according to an example embodiment of the present invention.

Figure 11:
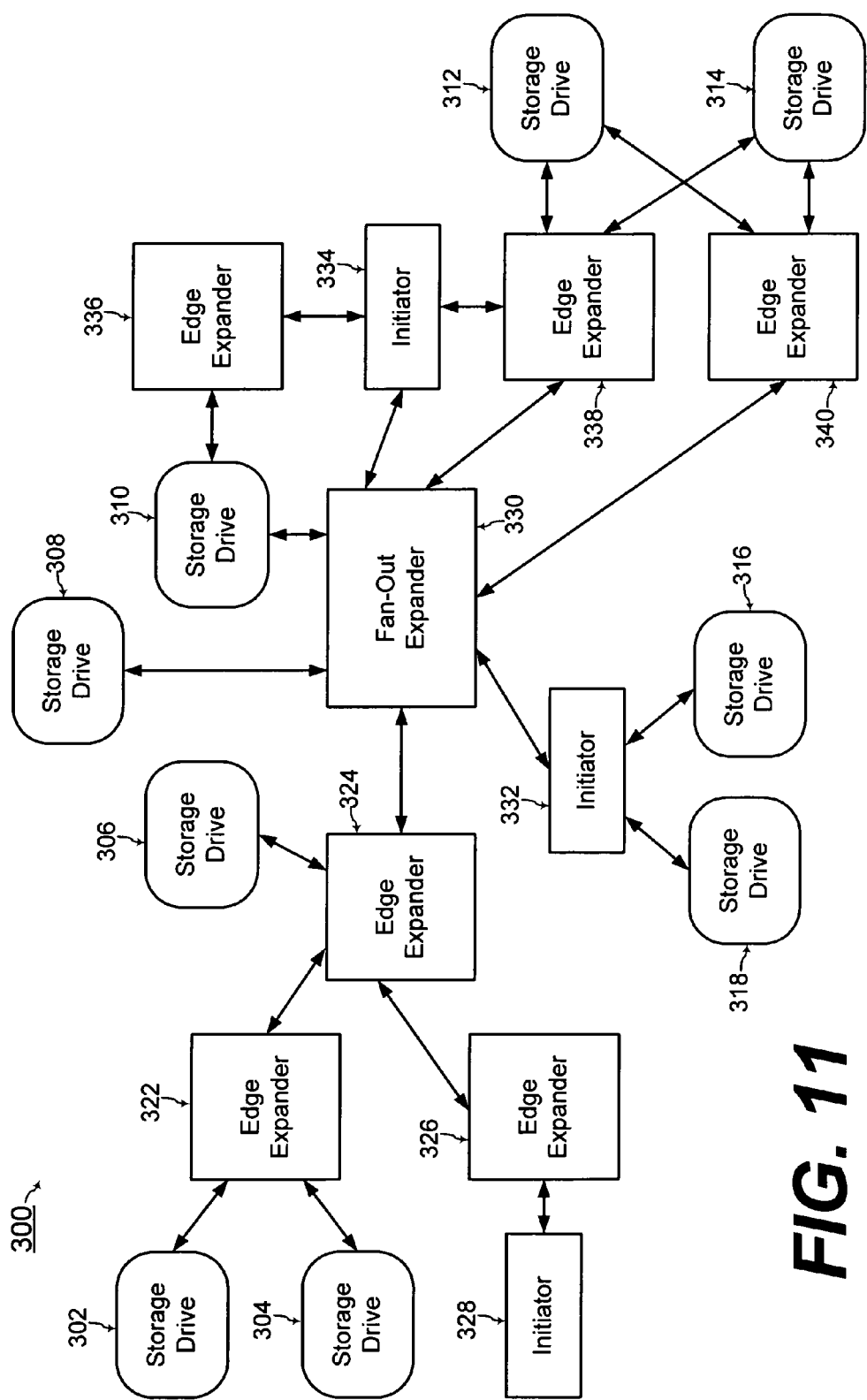
FIG. 11 shows a block diagram of a SAS (serial attached SCSI) system having at least one of the data storage device of FIG. 1, according to another example embodiment of the present invention.

FIG. 11 shows a block diagram of a SAS (serial attached SCSI) system 300 having a plurality of storage devices including a first storage device 302, a second storage device 304, a third storage device 306, a fourth storage device 308, a fifth storage device 310, a sixth storage device 312, a seventh storage device 314, an eighth storage device 316, and a ninth storage device 318.

The SAS system 300 also includes a first edge expander 322 coupled to the first and second storage device 302 and 304. The SAS system 300 further includes a second edge expander 324 coupled to the third storage device 306 and the first edge expander 322 and a third edge expander 326 that is coupled to a first initiator 328.

The SAS system 300 further includes a fan-out expander 330 coupled to the fourth and fifth storage devices 308 and 310, the second edge expander 324, and a second initiator 332 that is coupled to the eighth and ninth storage drives 316 and 318. The fan-out expander 330 is also coupled to a third initiator 334 that is coupled to a fourth edge expander 336. The fourth edge expander 336 is also coupled to the fifth storage device 310. The fan-out expander 330 is further coupled to a fifth edge expander 338 and a sixth edge expander 340 that are each coupled to the sixth and seventh storage drives 312 and 314.

The edge expanders 322, 324, 326, 336, 338, and 340, the fan-out expander 330, and the initiators 328, 332, and 334 are generally and individually known to one of ordinary skill in the art. Any of the storage devices 302, 304, 306, 308, 310, 312, 314, 316, and 318 is implemented similarly as the nonvolatile storage device 104 of FIG. 1 as described herein, according to an example embodiment of the present invention.

Figure 12:
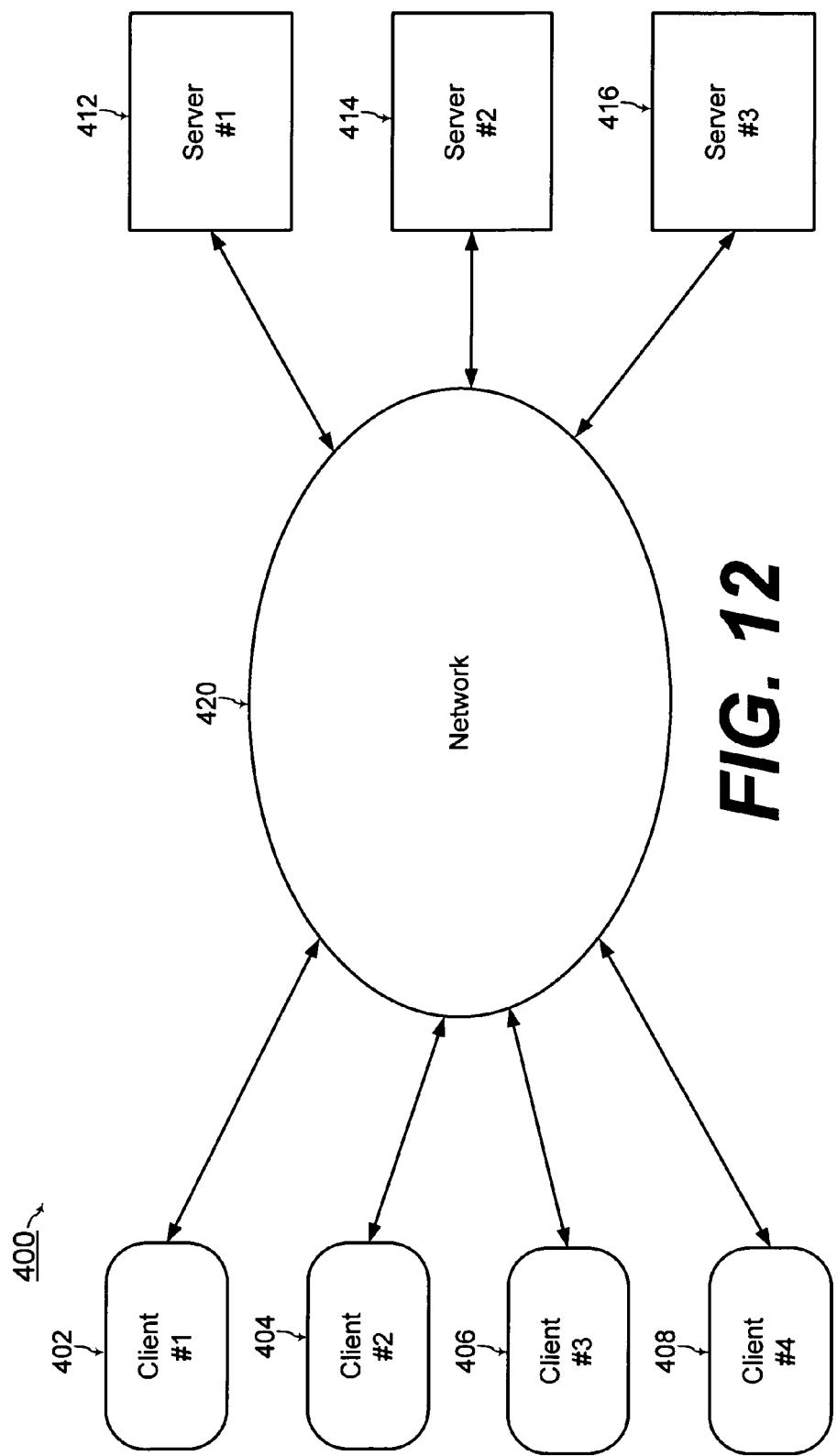
FIG. 12 shows a block diagram of a server system having at least one of the data storage device of FIG. 1, according to another example embodiment of the present invention.

FIG. 12 shows a block diagram of a server system 400 (i.e., a computer network) having a plurality of clients including a first client 402, a second client 404, a third client 406, and a fourth client 408. The server system 400 also includes a first server 412, a second server 414, and a third server 416. The clients 402, 404, 406, and 408 and the servers 412, 414, and 416 are coupled via a communications network 420. Any of the clients 402, 404, 406, and 408 and the servers 412, 414, and 416 has a respective storage device therein that is implemented similarly as the nonvolatile storage device 104 of FIG. 1 as described herein, according to an example embodiment of the present invention.

Figure 13:
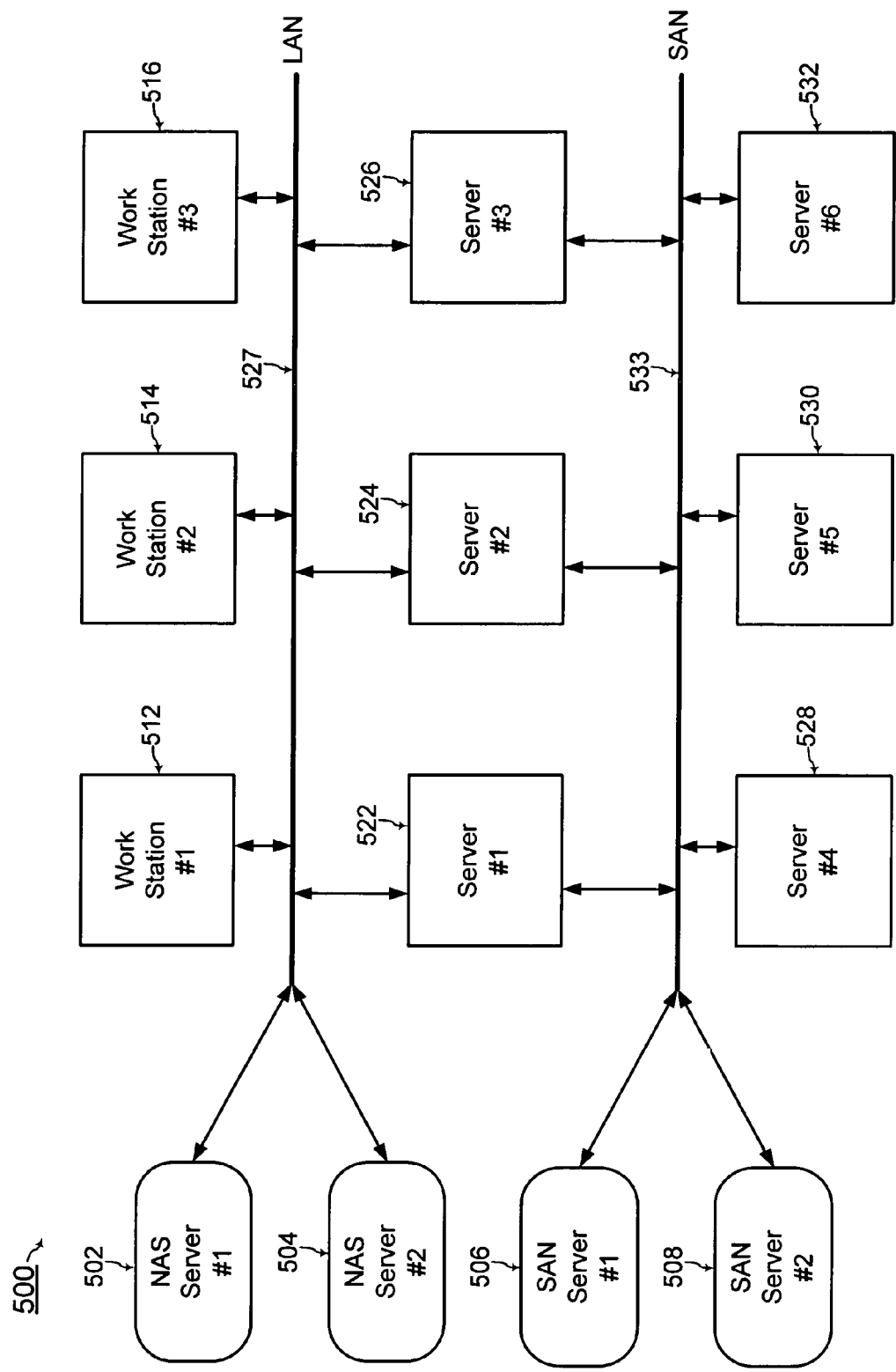
FIG. 13 shows a block diagram of a SAN (storage area network) system having at least one of the data storage device of FIG. 1, according to another example embodiment of the present invention.

FIG. 13 shows a block diagram of a SAN (storage area network) system 500 according to an example embodiment of the present invention. The SAN system 500 includes a first NAS (network attached storage) sever 502, a second NAS (network attached storage) sever 504, a first SAN (storage area network) sever 506, and a second SAN (storage area network) sever 508.

The SAN system 500 also includes a first work station 512, a second work station 514, a third work station 516, a first server 522, a second server 524, and a third server 526 that are coupled to the NAS servers 502 and 504 via a LAN (local area network) 527. The SAN system 500 further includes a fourth server 528, a fifth server 530, and a sixth server 532 coupled to the SAN servers 506 and 508 along with the first, second, and third servers 522, 524, and 526 via a SAN (storage area network) 533.

Any of the components 502, 504, 506, 508, 512, 514, 516, 522, 524, 526, 528, 530, and 532 has a respective storage device therein that is implemented similarly as the nonvolatile storage device 104 of FIG. 1 as described herein, according to an example embodiment of the present invention.

The foregoing is by way of example only and is not intended to be limiting. For example, any number of elements as illustrated and described herein is by way of example only. The present invention is limited only as defined in the following claims and equivalents thereof.

The invention claimed is:

1. A method for processing a command from a host in a data storage device, comprising:
    updating at least one of first and second bits of first and second bitmaps located within the data storage device and not within the host to indicate that the command is received; and
    storing said command to a firmware command que that is generated by firmware when a comparison of the first and second bits of the first and second bitmaps indicates receipt of said command;
    wherein the first and second bitmaps are formed in hardware;
    and wherein the first bit of the first bitmap is set by said hardware when the command is received, and wherein the second bit of the second bitmap is set by said firmware when the command has been stored into said firmware command que.

2. The method of claim 1, wherein the first bitmap is read-only to said firmware, and wherein the second bitmap is read/write to said firmware.

3. The method of claim 2, wherein the first bitmap includes a respective first bit that is read-only to said firmware and is read/write to said hardware for each command, and wherein the second bitmap includes a respective second bit that is read/write to said firmware for each command.

4. The method of claim 3, further comprising:
    generating a first interrupt when the respective first bit has been set by said hardware and when the respective first and second bits for said command are different;
    storing said command into said firmware command que when the first interrupt is generated; and
    setting the respective second bit by the firmware after the command is stored into said firmware command que.

5. The method of claim 4, further comprising:
    performing said command stored in said firmware command que when said respective first and second bits are set; and
    resetting said respective first bit by said hardware after said command is performed.

6. The method of claim 5, further comprising:
    generating a second interrupt when the respective first bit has been reset by said hardware and when the respective first and second bits for said command are different;
    resetting said respective second bit by said firmware when the second interrupt is generated; and
    removing said command from said firmware command que.

7. The method of claim 5, further comprising:
    sending an auto-response signal to the host that sent said command after said command is performed; and
    receiving an acknowledge signal from said host;
    wherein said respective first bit is reset by said hardware after said acknowledge signal is received.

8. The method of claim 1, further comprising:
    storing information about said command into a command information table generated in the hardware when the command is received; and
    transferring said information about said command from the command information table into said firmware command que when said command is stored into said firmware command que.

9. The method of claim 1, wherein the command is sent from the host to the data storage device via a high speed serial interface.

10. The method of claim 9, wherein the data storage device is within one of a client or a server of a computer network.

11. A controller for processing a command in a data storage device after a host sends the command, comprising:
    first and second bitmaps including first and second bits formed in hardware located within the data storage device and not within the host, wherein at least one of the first and second bits are updated to indicate that the command is received; and
    a firmware command que generated by firmware for storing said command when a comparison of the first and second bits indicates receipt of said command;
    wherein the first and second bitmaps are formed in a hardware register module;
    and wherein the firmware includes:
    at least one memory device having sequences of instructions stored thereon; and
    a data processor for executing said sequences of instructions such that the firmware performs steps of:
    comparing the first and second bits of the first and second bitmaps; and
    generating said firmware command que for storing said command when said comparison of the first and second bits indicates receipt of said command;
    and wherein the first bit of the first bitmap is set by said hardware when the command is received, and wherein the data processor executes said sequences of instructions such that the firmware performs a further step of:
    setting the second bit of the second bitmap when the command has been stored into said firmware command que.

12. The controller of claim 11, wherein the first bitmap is read-only to said firmware, and wherein the second bitmap is read/write to said firmware.

13. The controller of claim 12, wherein the first bitmap includes a respective first bit that is read-only to said firmware and is read/write to said hardware for each command, and wherein the second bitmap includes a respective second bit that is read/write to said firmware for each command.

14. The controller of claim 13, further comprising:
    an interrupt controller for generating a first interrupt when the respective first bit has been set by said hardware and when the respective first and second bits for said command are different;
    wherein the firmware stores said command into said firmware command que when the first interrupt is generated, and wherein said firmware sets the respective second bit after the command is stored into said firmware command que.

15. The controller of claim 14, wherein said command stored in said firmware command que is performed when said respective first and second bits are set, and wherein said respective first bit in said first bitmap is reset by said hardware after said command is performed.

16. A data storage system comprising:
    a data storage device;
    a host sending a command to the data storage device; and
    a controller for processing the command in the data storage device after the host sends the command, the controller comprising:
    first and second bitmaps including first and second bits formed in hardware located within the data storage device and not within the host, wherein at least one of the first and second bits are updated to indicate that the command is received; and
    a firmware command que generated by firmware for storing said command when a comparison of the first and second bits indicates receipt of said command;
    wherein the first and second bitmaps are formed in a hardware register module;

and wherein the firmware includes:

at least one memory device having sequences of instructions stored thereon; and a data processor executing said sequences of instructions such that the firmware performs steps of:

comparing the first and second bits of the first and second bitmaps; and generating said firmware command que for storing said command when said comparison of the first and second bits indicates receipt of said command;

and wherein the first bit of the first bitmap is set by said hardware when the command is received, and wherein the data processor executes said sequences of instructions such that the firmware performs a further step of:

setting the second bit of the second bitmap when the command has been stored into said firmware command que.

17. The data storage system of claim 16, wherein the first bitmap is read-only to said firmware, and wherein the second bitmap is read/write to said firmware.

18. The data storage system of claim 17, wherein the first bitmap includes a respective first bit that is read-only to said firmware and is read/write to said hardware for each command, and wherein the second bitmap includes a respective second bit that is read/write to said firmware for each command.

19. The data storage system of claim 18, wherein the controller further includes:

an interrupt controller for generating a first interrupt when the respective first bit has been set by said hardware and when the respective first and second bits for said command are different;

wherein the firmware stores said command into said firmware command que when the first interrupt is generated, and wherein said firmware sets the respective second bit after the command is stored into said firmware command que.

20. The data storage system of claim 19, wherein said command stored in said firmware command que is performed when said respective first and second bits are set, and wherein said respective first bit in said first bitmap is reset by said hardware after said command is performed.

* * * * *